United States Patent [19]

Ueki et al.

[11] Patent Number: 5,042,329
[45] Date of Patent: Aug. 27, 1991

[54] CONTROL SYSTEM FOR AUTOMATIC TRANSMISSION FEATURING IMPROVED DOWNSHIFTING CHARACTERISTICS WITH OVERDRIVE INHIBITOR

[75] Inventors: Akihiro Ueki, Zama; Kazuhiko Sugano, Yokohama; Koichi Hayasaki, Fujisawa, all of Japan

[73] Assignee: Nissan Motor Co., Ltd., Yokohama, Japan

[21] Appl. No.: 264,703

[22] Filed: Oct. 31, 1988

[30] Foreign Application Priority Data

Oct. 30, 1987 [JP] Japan .................. 62-273219

[51] Int. Cl.⁵ ............................................. F16H 61/16
[52] U.S. Cl. ............................................. 74/868
[58] Field of Search ........................................ 74/868

[56] References Cited

U.S. PATENT DOCUMENTS

| | | | |
|---|---|---|---|
| 4,106,369 | 8/1978 | Taga | 74/868 X |
| 4,291,596 | 9/1981 | Sakakibara | 74/868 X |
| 4,406,181 | 9/1983 | Kubo et al. | 74/868 X |
| 4,485,695 | 12/1984 | Kawamoto | 74/868 X |
| 4,566,355 | 1/1986 | Sugano | 74/868 X |
| 4,719,822 | 1/1988 | Morisawa | 74/868 X |
| 4,823,648 | 4/1989 | Hayakawa et al. | 74/868 X |
| 4,967,611 | 11/1990 | Sugano | 74/868 |

FOREIGN PATENT DOCUMENTS 62-17454 1/1987 Japan .

OTHER PUBLICATIONS

THM 700-R4 Principles of Operation, Hydra-Matic, Second Edition, pp. 68, 70.

Primary Examiner—Leslie A. Braun
Assistant Examiner—Khui Q. Ta
Attorney, Agent, or Firm—Foley & Lardner

[57] ABSTRACT

A shift valve which controls the shifting of the transmission between the top speed and the next lower one is arranged to have a port which is communicable with an overrunning clutch viz a relatively short conduit arrangement. The port is arranged to be constantly supplied with line pressure while the manual valve is set in any of the forward drive ranges, and to be communicated with the conduit when the shift valve is supplied with a top speed inhibit signal and induced to assume its downshift position.

10 Claims, 4 Drawing Sheets

FIG. 4

| | | R/C | H/C | F/C | O/C | B/B 2A | B/B 3R | B/B 4A | L&R/B | F/O | L/O | GEAR RATIO | $\alpha_1 = 0.45$ $\alpha_2 = 0.45$ |
|---|---|---|---|---|---|---|---|---|---|---|---|---|---|
| D RANGE | 1ST (ENGINE DRIVING) | | | ○ | | | | | | ○ | ○ | $\dfrac{1+\alpha_1}{\alpha_1}$ | 3.22 |
| | 2ND (ENGINE DRIVING) | | | ○ | | ○ | | | | ○ | | $\dfrac{\alpha_1+\alpha_2+\alpha_1\alpha_2}{\alpha_1(1+\alpha_2)}$ | 1.69 |
| | 3RD (ENGINE DRIVING) | | ○ | ○ | | ○ | ○ | | | ○ | | 1 | 1 |
| | 4TH (ENGINE DRIVING) | | ○ | (○) | ○ | ○ | ○ | ○ | | | | $\dfrac{1}{1+\alpha_2}$ | 0.69 |
| | 1ST (ENGINE BRAKING) | | | (○) | ○ | | | | | | | | |
| | 2ND (ENGINE BRAKING) | | | (○) | ○ | ○ | | | | | | | |
| | 3RD (ENGINE BRAKING) | | ○ | (○) | ○ | ○ | ○ | | | | | | |
| | 4TH (ENGINE BRAKING) | | ○ | (○) | | ○ | ○ | ○ | | | | | |
| 2ND RANGE | 1ST | | | ○ | | | | | | ○ | | | |
| | 2ND | | | ○ | | ○ | | | | ○ | ○ | | |
| 1ST RANGE | 1ST | | | ○ | | | | | ○ | ○ | | | |
| REVERSE | | ○ | | | | | | | ○ | | | $-\dfrac{1}{\alpha_2}$ | −2.22 |

( ) UNRELATED TO POWER TRANSMISSION

CONTROL SYSTEM FOR AUTOMATIC TRANSMISSION FEATURING IMPROVED DOWNSHIFTING CHARACTERISTICS WITH OVERDRIVE INHIBITOR

BACKGROUND OF THE INVENTION

1. Field of the Invention

The present invention relates to an automatic transmission for use in automotive vehicles, and more specifically to a hydraulic control system for such a transmission which features a valve arrangement which improves the rapidity with which engine braking can be produced in response to a manually induced signal to inhibit the top speed of the transmission.

2. Description of the Prior Art

THM700- R4 PRINCIPLES OF OPERATION discloses an automatic transmission arrangement which can produce four forward speeds. In this instance the fourth speed is arranged to produce an overdrive.

This system includes a manual valve which can be selectively moved between P, R, N, D and 3rd, 2nd and 1st manual ranges. When the manual valve is set in D range the transmission is able to automatically shift between the first and fourth speeds, when conditioned to establish the manual third speed range, fourth speed is inhibited and the transmission is permitted to shift only between first and third speeds. Viz., in this condition overdrive is inhibited. When the 3-4 shift valve of this arrangement assumes its 3rd speed or downshift position, a band brake of the transmission is released and at the same time the hydraulic pressure from the manual valve is transmitted via the 4-3 sequence valve to an overrunning clutch. Under these conditions engine braking is produced in speeds below fourth gear.

However, this arrangement has suffered from the drawback in that a delay occurs between the time the manual valve is moved into the manual third speed range position and the time wherein the overrunning clutch actually becomes engaged. That is to say, when the manual valve is moved from D range to the manual third speed range, the line pressure which is supplied from the oil pump to the manual valve has to pass through the conduits interconnecting the manual valve, the 4-3 sequence valve, and the overrunning clutch. This defines a relatively long pressure transmission path which delays the supply of pressure and results in the overunning clutch not being engaged as quickly as preferred. Accordingly, for a period following the D-3 select, engine braking is not produced and deteriorates both the response characteristics of the transmission and the driver's sense of control over the transmission.

SUMMARY OF THE INVENTION

It is an object of the present invention to provide a transmission having a control system which reduces the delay between a manually induced change indicative of a demand for engine braking and the conditioning of the transmission in a manner which fullfills the requirement.

In brief, the above object is achieved by an arrangement wherein a shift valve which controls the shifting of the transmission between the top speed and the next lower one is arranged to have a port which is communicable with an overrunning clutch via a relatively short conduit arrangement. The port is arranged to be constantly supplied with line pressure while the manual valve is set in any of the forward drive ranges, and to be communicated with the conduit hen the shift valve is supplied with a top speed inhibit signal and induced to assume its downshift position.

More specifically, a first aspect of the present invention is deemed to comprise a transmission which features: a shift valve which controls the shifting of the transmission between the top speed and the next lower one, the shift valve having a port which is communicable with a friction element via a relatively short fluid path the friction element being arranged to enable the transmission to produce engine braking when engaged, the port being arranged to be constantly supplied with line pressure while a manual valve is set in any of a plurality of forward drive ranges, the port being communicated with the relatively short fluid path when the shift valve is supplied with a top speed inhibit signal and is induced to assume its downshift position.

A second aspect of the present invention is deemed to comprise a control system for an automatic transmission; which features a manual valve, the manual valve having a plurality of forward drive positions, a shift valve, the shift valve having a port which is constantly supplied with hydraulic fluid under pressure while the manual valve is set in any one of the forward drive positions, the shift valve being arranged to control the shifting of the transmission between a top forward speed and the next lower forward speed, a friction element, the friction element being arranged to induce the transmission to produce engine braking when engaged; a relatively short fluid path leading from the shift valve to the friction element; means for producing an inhibit signal when it is desired that the transmission be prevented from upshifting to the top speed, the shift valve being arranged to be responsive to the inhibit signal in a manner to communicate the conduit with the port and to assume a downshift position wherein the transmission is conditioned to produce the next lower forward speed.

A third aspect of the present invention is deemed to comprise a control system for an automatic transmission, the transmission being capable of being selectively conditioned to produce first and second sequential speeds, the first speed being higher than the second speed and the top speed of the transmission. The control system features a friction element, the friction element being arranged in the transmission so that when it is engaged with the transmission it is conditioned to produce the second speed and engine braking can be produced. Also, means for producing a first speed inhibit signal, a shift valve, the shift valve being fluidly interposed between a source of hydraulic fluid under pressure and the friction element, the shift valve controlling the shifting of the transmission between the first and second speeds, the shift valve having a first port which is supplied with hydraulic fluid under pressure when the transmission is conditioned to assume the first and second speeds, the shift valve being adapted so that in the presence of the first speed inhibit signal hydraulic fluid under pressure is supplied to the friction element from the first port.

A fourth aspect of the present invention is deemed to comprise a control system for an automatic transmission, the transmission being capable of being selectively conditioned to produce first and second sequential speeds, the first speed being higher than the second speed and the top speed of the transmission. The control system features a friction element, the friction element being arranged in the transmission so that when it is engaged with the transmission it is conditioned to produce the second speed, and engine braking can be produced means for producing a first speed inhibit signal; a shift valve, the shift valve being fluidly interposed between a source of hydraulic fluid under pressure and the friction element, the shift valve controlling the shifting of the transmission between the first and second speeds, the shift valve having a first port which is supplied with hydraulic fluid under pressure when the transmission is conditioned to assume the first and second speeds, the shift valve having an element which can assume first and second positions, the element being such that in the first position communication between the first port and the friction element is prevented and in the second position communication between the first port and the friction element is established, the element being responsive to the presence of the first speed inhibit signal to assume the second position.

BRIEF DESCRIPTION OF THE DRAWINGS

FIG. 4 is a table showing the relationship between the friction element engagement and the gear ratios produced by the transmission shown in FIGS. 2 and 3.

DESCRIPTION OF THE PREFERRED EMBODIMENTS

Figure 2:
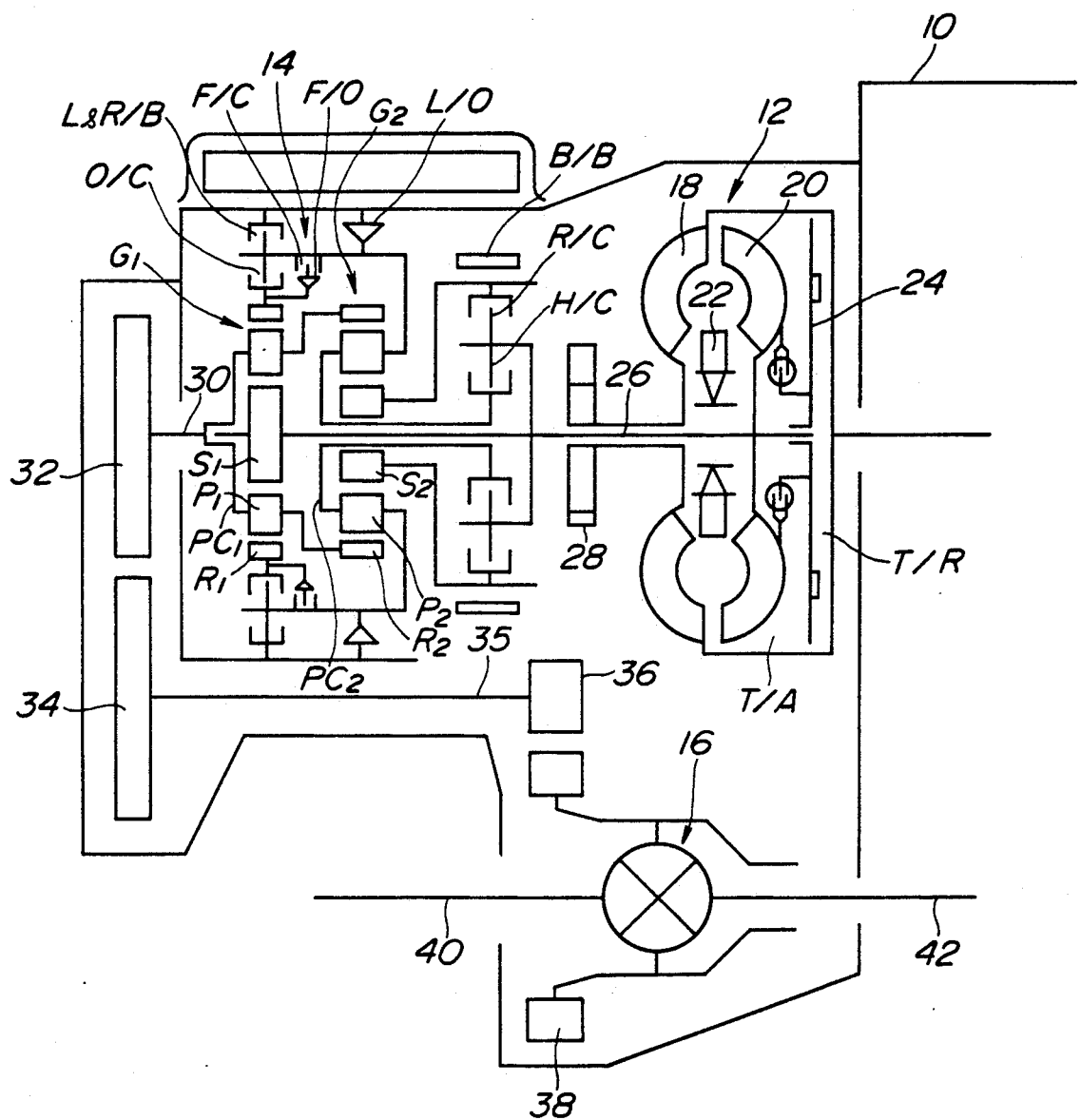
FIG. 2 is a schematic elevation showing an example of a transaxle to which the embodiments of the present invention can be applied.

FIG. 2 shows in schematic elevational form, an automatic transaxle which includes a torque converter 12, a planetary gear train and a differential or final drive unit 16. This unit is arranged traversely across the vehicle chassis and is connected to an engine 10 at one end thereof. The torque converter (T/C) in this instance includes a pump impeller 18, turbine runner 20, stator 22 and a lock-up clutch 24. With this arrangement when the lock-up clutch 24 is disengaged torque from the engine crankshaft (no numeral) is supplied by way of the pump impeller 18 to a transmission input shaft 26. However, upon engagement of the lock-up clutch 24 the torque is supplied directly to the input shaft 26.

In this transaxle the lock-up clutch 24 is arranged to be responsive to the pressure differential which exists between an apply chamber A/T and a release chamber T/R. It should be noted that an oil pump 28 which outputs pressurized hydraulic fluid is arranged to be driven by the T/C.

The planetary gear train includes first and second gear units G1, G2. The first unit G1 includes a sun gear S1, an internal or ring gear R1 and pinion gears P1 which mesh with the ring and sun gears. The pinion gears are of course are rotatably disposed on a pinion carrier PC1. The second unit G2 similarly includes a sun gear S2, a ring gear R2, pinion gears P2 and a carrier PC2.

The sun gear S1 of the first unit G1 is connected to the input shaft 26 in a manner to undergo synchronous rotation therewith while pinion carrier PC1 and the ring gear R2 of the second unit G2 are connected with a transmission output shaft 30. The ring gear R1 of the first unit G1 is selectively connectable with carrier PC2 by way of the forward oneway cluch F/0 and the overrunning clutch O/C. Sun gear S2 is selectively connectable with the input shaft 26 by way of the reverse clutch R/C, while the pinion carrier PC2 is arranged to be connectable with the same via a high clutch H/C.

Sun gear S2 can be selectively rendered stationary via the application of a band brake B/B while the pinion carrier PC2 is operatively connected with the parallely arranged low one-way clutch L/O and low and reverse brake L&R/8 in a manner which enables the same to be selectively held stationary.

An output gear 32 is fixed to one end of the output shaft 30 and arranged to mesh with an idler gear 34. The latter mentioned gear is fixed to one end of a idler shaft 36 which extends parallel to the input shaft 26 and passes back through the transmission as shown. A reduction gear 36 is provided at the inboard end of the idler shaft 35. This gear meshes with a ring gear 38 of the differential unit 16.

Torque is delivered to the wheels of the vehicle by way of stub shafts 40 and 42. In this instance the shafts 40 and 42 are respectively connected with the forward left and right hand wheels of the vehicle.

With the above described arrangement selective engagement and/or use of the clutches F/C, H/C, O/C, R/C, the brakes B/B and L&R/B and the one way clutches F/0 and L/0 it is possible to condition the first and second planetary gear units G1 and G2 to produce four forward and one reverse gear ratios in the manner as depicted in the table shown in FIG. 4.

It should be noted that in this table the circles denote the engagement of an element and or the use of a one-way clutch. In this transmission the engagement of the band brake B/B is controlled by a servo having first, second and third chambers. That is, a second speed apply chamber 2A, a third speed release chamber 3R and a fourth speed apply chamber 4A. In connection with these chambers the circular indicia in the table indicates the chamber being applied with hydraulic pressure. Further, in this table alpha 1 and alpha 2 indicate the ratios of the teeth on the ring gears R1 and R2 and the corresponding sun gears S1 and S2, respectively. The gear ratio defined in the table denotes the ratios defined between the rotational speeds of the output and input shafts 30, 26.

With the above described transmission arrangement, rotational power or torque is transferred via the gear train from the input shaft 26 to the output shaft 30 and to the final drive or differential unit 16 by way of the output gear 30, the idler gear 34, reduction gear 36 and the ring gear 30. In fourth speed an overdrive condition is established.

Figure 1:
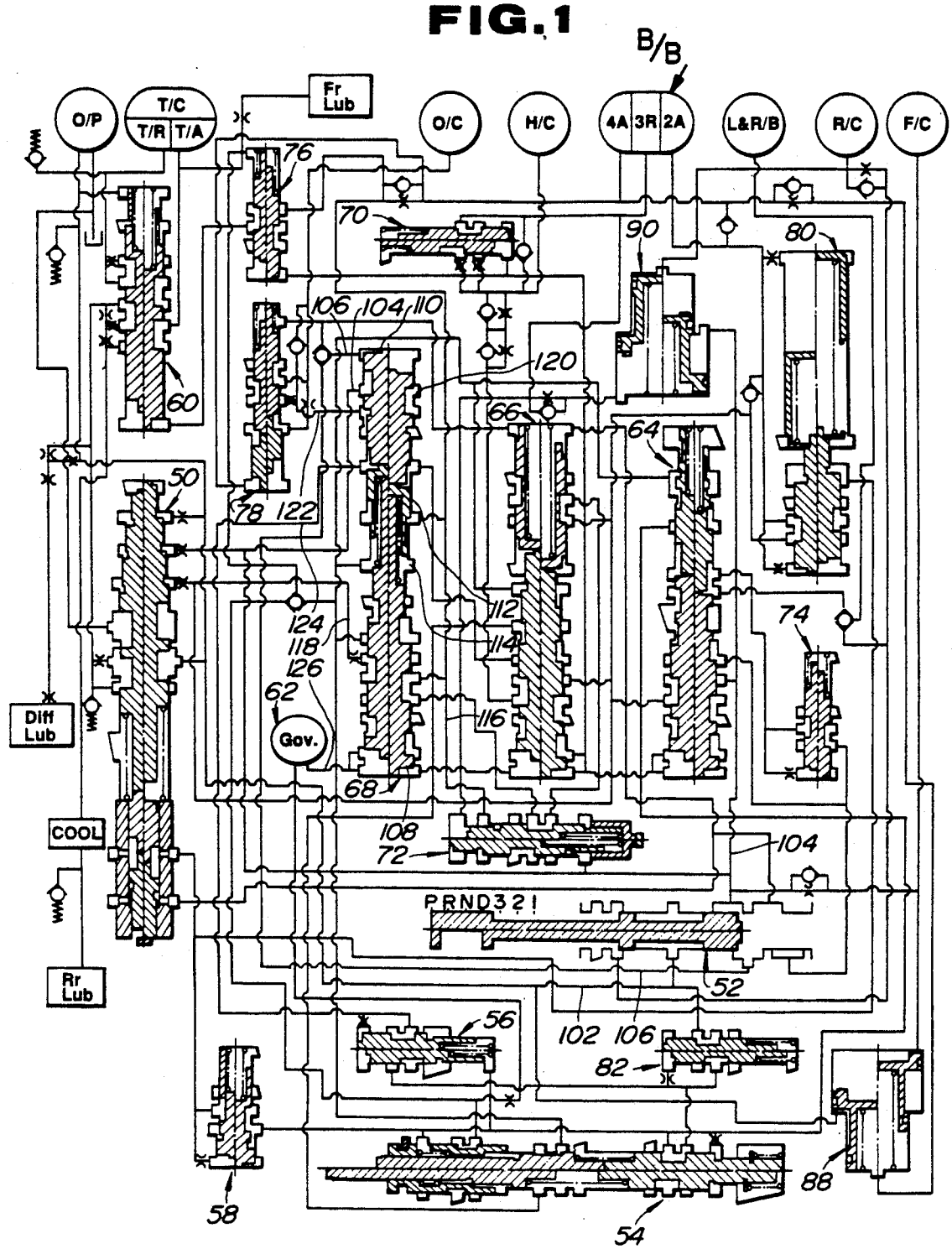
FIG. 1 shows a hydraulic control circuit which incorporates a first embodiment of the present invention.

In order to control the above described gear train a hydraulic spool valve system of the nature shown in FIG. 1 is used.

This system includes a pressure regulator valve 50, a manual valve 52, a throttle valve 54, a throttle pressure modifier valve 58, a lock-up control valve 60, a governor valve 62, a 1-2 shift valve 64, a 2-3 shift valve 66, a 3-4 shift valve 68, a 3-2 timing valve 70, a 4-2 sequence valve 72, a fixed first speed pressure reducing valve 74, a speed cut-back valve 76, an overrunning clutch control valve 78, a 1-2 accumulator valve 80, a kickdown modifier valve 82, an N-D accumulator 88 and a servo release accumulator 90.

As shown in FIG. 1, the manual valve 52 of this embodiment is arranged to be selectively moved to any of 7 different ranges. Viz., P, R, N, D, 3rd, 2nd, and 1st. When set in the D range line pressure which is supplied through conduit 102 is transferred into conduit 104, while valve 52 is set in any of the forward speed range other than the D range, line pressure is also supplied into conduit 106.

The 3-4 shift valve 68 includes first and second spool valve elements 108 and 110. A sleeve 112 which encloses the inboard end of the first spool valve element 108, is disposed in the valve bore in a manner to be interposed between the two elements. A compression spring 114 is disposed between the spool valve element 108 and the sleeve 112 and arranged to bias the same apart. The left-hand section of the first spool valve element 108 denotes the upshift position of the valve wherein communication between conduits 116 and 118 is established, and line pressure is supplied to the fourth speed apply chamber 4A of the band brake servo. When the second spool element 110 assumes its upshift position as shown by the left-hand half section, communication between conduits 104 and 122 is cut-off. However, upon moving to the downshift position (shown by the right hand section), communication between these two conduits (viz., 104 and 122) is established.

When the manual valve 52 is in any one of the D or 3rd, 2nd and 1st manual speed ranges, line pressure is supplied from the manual valve 52 into conduit 104. Further, as previously mentioned, when the manual valve 52 is set in third, second and first manual speed ranges, line pressure is also supplied into conduit 106. In addition to this, line pressure is also supplied via conduit 122 to the overrunning clutch O/C. The pressure supplied into conduit 106 from the manual valve 52 is applied in the form of signal (hereinafter referred to as a fourth speed inhibit signal) denoting the requirement to limit the upshifting of the transmission to third speed, to the top of the shift valve 68.

The modified throttle pressure is supplied by the throttle pressure modifier valve 56 via conduit 124 into the shift valve bore between the sleeve 112 and the second spool valve element 110. On the other hand, governor pressure is applied to the bottom of the first spool valve element 108.

The operation of this embodiment is such that when the manual valve 52 is set in D range, the first spool valve element 108 of the 3-4 shift valve 68 is moved between the upshift and downshift positions in response to a balance established between the governor pressure and the modified throttle pressure. When the force produced by the governor pressure exceeds that produced by the modified throttle pressure, the spool valve element 108 is induced to assume its upshift position and establish communication between conduits 118 and 116. In response to this upshift, the band brake B/B becomes engaged and in combination with the previously engaged high cluch H/C, the transmission is conditioned in a manner to produce fourth speed.

While the manual valve 52 is set in D range, line pressure is not supplied into conduit 106 and as a result, the second spool valve element 110 is able to move upwardly in the spool bore (to assume its upshift position shown by the left hand section) under the influence of the hydraulic pressure which develops between the top of the sleeve 112 and the bottom of the second spool valve element 110. With the second spool valve element 110 in this position the communication between conduits 104 and 122 is cut-off and hydraulic fluid is not supplied to the overrunning clutch O/C.

However, when the manual valve is shifted from the D range position to the manual third speed range one, in response to the select lever being manually manipulated, the above mentioned fourth speed inhibit signal is produced by the supply of line pressure into conduit 106. As the top of the second spool valve element has a larger effective cross-sectional area than the lower end thereof, the fourth speed inhibit signal acts on the top of the second spool valve element 110 and produces a bias which moves the same downwardly. This movement subsequently moves the first spool valve element 108 and the sleeve 112 to their respective downshift positions.

As a result, port 120 and conduit 122 are placed in fluid communication and hydraulic fluid is supplied from conduit 104 to the overrunning clutch O/C by way of port 104. Additionally, band brake B/B assumes a released condition due to the communication between conduits 116 and 118 being cut-off. This induces a 4-3 downshift and conditions the transmission to produce third speed and provide engine braking.

As conduit 104 is previously supplied with line pressure from the manual valve 52, when the 3-4 shift valve downshifts under the influence of the fourth speed inhibit signal, line pressure can be transmitted to the overrunning clutch O/C via port 120 and a relatively short conduit arrangement, this results in obviating the flow restriction effect of the long flow path inherent in the prior art device discussed earlier, and the engagement of the O/C clutch can be induced as rapidly as is preferred and therefor in a manner which improves the response characteristics of the transmission.

It should be noted that even though in the above arrangement all three elements (108, 110, 112) disposed in the 3-4 shift valve bore are disclosed as being moved under the influence of the fourth speed inhibit signal, as the second spool valve element 108 initially moves under the influence of said signal, hydraulic fluid is permitted to flow toward the overrunning clutch O/C before the movement of the first spool element 108 toward its downshift position. This enables the initiation of the delivery of hydraulic fluid into conduit 122 slightly ahead of the draining of the fourth speed apply chamber 4a and enables the response with which the transmission is conditioned to produce engine braking in third speed to be markedly improved as compared with the previously discussed prior art arrangement.

It will be noted from FIG. 1 that conduit 122 communicates with the overrunning clutch O/C by way of an overrunning control valve 78. This valve is arranged to be responsive to the draining of the fourth speed apply chamber 4A of the band brake B/B in a manner which prevents the engagement of the overrunning clutch O/C before the band brake B/B is adequately released. However, as line pressure is supplied into conduit 122, the moment that the appropriate disengagement condition of the band brake is detected the appropriate pressure can be delivered with essentially no delay to the overrunning clutch O/C.

The construction and operation of the overrunning clutch control valve 78 is dealt with in detail in copending U.S. application Ser. No. (not yet available) which is based on the Japanese Patent application No. 62-273219 filed on Oct. 30, 1987 in the name of Nissan Motor Co. Ltd. The content of this document, which is briefly summarized in the above paragraph, is hereby incorporated by reference thereto.

Figure 3:
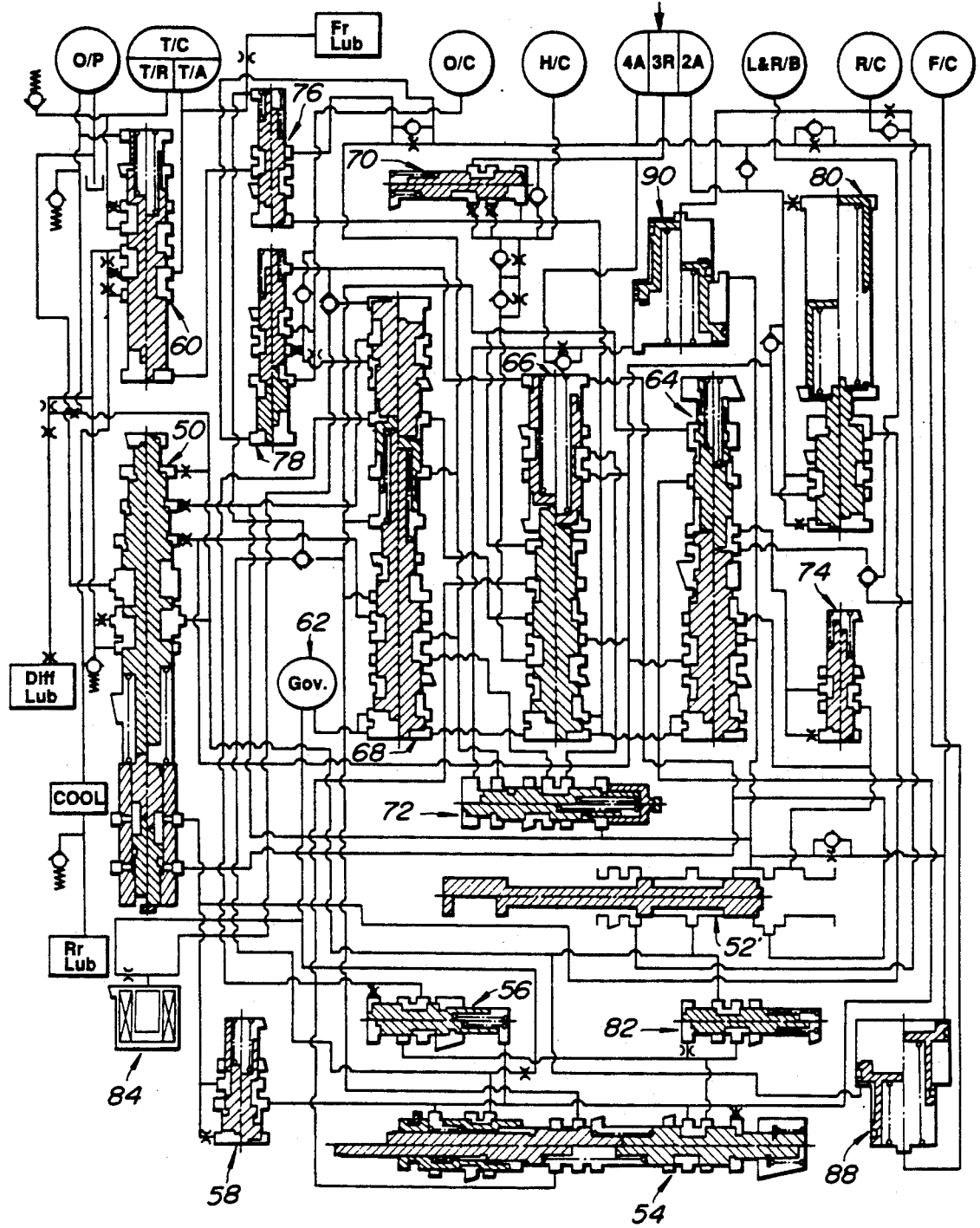
FIG. 3 shows a hydraulic control circuit which incorporates a second embodiment of the present invention.

As an alternative to the above arrangement, instead of inhibiting the fourth speed in the above mentioned 7 ranges using the manual valve 52 to produce the fourth speed inhibit signal, it is possible, as shown in FIG. 3, to provide a modified manual valve 52' which has only six ranges (viz., P, R, N, D, 2nd and 1st manual ranges) and add a solenoid valve such as element 84. By electrically sensing the movement of a manually operated select lever, the operation of a button switch (e.g. overdrive inhibit switch), or the like, it is possible to produce the fourth speed inhibit signal upon the detection of the lever or button being appropriately conditioned and inhibit 4th speed via energization of the solenoid of the valve 84. An example of this type of 6 range manual valve can be found in JP-A-62-17454.

What is claimed is:

1. In a control system for an automatic transmission, said transmission having an output shaft and
   a manual valve, said manual valve having a plurality of forward drive positions;
   a first friction element, said first friction element being supplied with hydraulic fluid under pressure when said manual valve is set in any one of said forward drive positions;
   a shift valve, said shift valve having a first port which is constantly supplied with hydraulic fluid under pressure while said manual valve is set in any one of said forward drive positions, said shift valve being arranged to control the shifting of said transmission between a top forward speed and a next lower forward speed;
   a second friction element, said second friction element being arranged to induce said transmission to produce engine braking when engaged;
   means defining a fluid path from said first port to said friction element for permitting hydraulic fluid under pressure to be transmitted to said second friction element and for minimizing the delay in engagement thereof;
   means for producing an inhibit signal when it is desired that said transmission be prevented from upshifting to said top speed, said shift valve being arranged to be responsive to said inhibit signal and to communicate said fluid path with said port and to assume a downshift position wherein said transmission is conditioned to produce said next lower forward speed.

2. In a control system for an automatic transmission, said transmission being capable of being selectively conditioned to produce first and second sequential speeds, said first speed being higher than said second speed and said first speed being a top speed of said transmission;
   a first friction element which is engaged during all forward speeds;
   a second friction element, said second friction element being arranged in said transmission so that when it is engaged and the transmission is conditioned to produce said second speed, engine braking can be produced;
   means for producing a first speed inhibit signal;
   a shift valve, said shift valve being fluidly interposed between a source of hydraulic fluid under pressure and said second friction element, said shift valve controlling the shifting of said transmission between said first and second speeds, said shift valve having a first port which is supplied with hydraulic fluid under pressure when said transmission is conditioned to assume said first and second speeds, said shift valve being adapted so that in the presence of said first speed inhibit signal hydraulic fluid under pressure is supplied to said second friction element from said first port.

3. In a control system for an automatic transmission, said transmission being capable of being selectively conditioned to produce first and second sequential speeds, said first speed being higher than said second speed and a top speed of said transmission;
   a first friction element, said first friction element being engaged in said first and second speeds;
   a second friction element, said second friction element being arranged in said transmission so that when it is engaged with the transmission conditioned to produce said second speed, engine braking can be produced;
   means for producing a first speed inhibit signal;
   a shift valve, said shift valve being fluidly interposed between a source of hydraulic fluid under pressure and said second friction element, said shift valve controlling the shifting of said transmission between said first and second speeds, said shift valve having a first port which is supplied with hydraulic fluid under pressure when said transmission is conditioned to assume said first and second speeds, said shift valve having an element which can assume first and second positions, said element being such that in said first position communication between said first port and said friction element is prevented, and in said second position communication between said first port and said friction element is established, said element being responsive to the presence of said first speed inhibit signal to assume said second position.

4. In a control system as claimed in claim 1 wherein said inhibit signal producing means is included in said manual valve, said manual valve having a top speed inhibit port which is fluidly communicated with said shift valve, said manual valve being arranged so that when it is set in a position wherein said transmission is to be conditioned in a manner to inhibit said top speed, hydraulic fluid is supplied via said top speed inhibit port to said shift valve, the hydraulic fluid which is discharged from said top speed inhibit port defining said first speed inhibit signal.

5. In a control system as claimed in claim 2 wherein said manual valve has a second port, said second port being fluidly communicated with said first port, said second port being supplied with hydraulic fluid when said manual valve is set to induce any one of said plurality of forward speeds other than top speed, said forward speeds including said first and second speeds.

6. In a control system as claimed in claim 2 wherein said inhibit signal producing means comprises a solenoid valve, said solenoid valve having a first state wherein a drain port is open and said inhibit signal is not produced and a second state wherein said drain port is closed and said inhibit signal is produced.

7. A control system as claimed in claim 1 wherein said first friction element is operatively connected with a one-way clutch and wherein said second friction element is arranged to lock said one-way clutch when engaged.

8. A control system as claimed in claim 2 wherein said first friction element is operatively connected with a one-way clutch, and wherein said second friction element is arranged to lock said one-way clutch when engaged.

9. A control system as claimed in claim 3 wherein said first friction element is operatively connected with a one-way clutch and wherein said second friction element is arranged to lock said one-way clutch when engaged.

10. In a transmission having an output shaft:

a shift valve which controls the shifting of the transmission between a top speed and a next lower one, said shift valve having a first port and a second port, said first port being supplied with hydraulic fluid under pressure from a manual valve during all forward speeds, said shift valve being arranged to place said first and second ports in fluid communication when it assumes a downshift condition;

a first friction element which is engaged during all forward speeds, said first friction element being operatively connected with a one-way clutch;

a second friction element, said second friction element being disposed with said one-way clutch so that when said second friction element is engaged, the transmission is conditioned to produce engine braking, said second friction element being fluidly communicated with said second port via conduit means which permits hydraulic fluid under pressure to be supplied to said second friction element with a minimal delay; and means for producing a top speed inhibit signal which is applied to said shift valve, said top speed inhibit signal causing said shift valve to assume said downshift condition wherein said first and second ports are placed in fluid communication with one another.

* * * * *